United States Patent [19]

Laaman et al.

[11] Patent Number: 5,955,136
[45] Date of Patent: Sep. 21, 1999

[54] LOW FAT, SHELF-STABLE, READY-TO-DRINK MILK SHAKE BEVERAGES HAVING THE MOUTH FEEL OF HIGH FAT MILK SHAKE BEVERAGES

[75] Inventors: Thomas R. Laaman, Danbury, Conn.; Pei K. Chang, Cortlandt Manor, N.Y.

[73] Assignee: Pepsico, Inc., Purchase, N.Y.

[21] Appl. No.: 09/079,281

[22] Filed: May 15, 1998

[51] Int. Cl.$^6$ ..................................................... A23C 23/00
[52] U.S. Cl. .......................... 426/569; 426/564; 426/565; 426/575; 426/580; 426/584; 426/593
[58] Field of Search .................................... 426/593, 570, 426/569, 584, 565, 575, 564, 580

[56] References Cited

U.S. PATENT DOCUMENTS

| | | |
|---|---|---|
| 2,507,482 | 5/1950 | Scott ........................................ 426/569 |
| 2,941,885 | 6/1960 | Tomlinson ............................... 426/569 |
| 3,176,003 | 3/1965 | Stancioff . |
| 3,342,612 | 9/1967 | Foster et al. . |
| 3,385,714 | 5/1968 | Smith ...................................... 426/593 |
| 3,556,810 | 1/1971 | Moirano . |
| 3,800,036 | 3/1974 | Gabby et al. ........................... 426/566 |
| 3,914,440 | 10/1975 | Witzig .................................... 426/130 |
| 3,962,482 | 6/1976 | Comer et al. . |
| 3,968,266 | 7/1976 | Baugher ................................. 426/524 |
| 3,969,534 | 7/1976 | Pavey et al. . |
| 4,031,261 | 6/1977 | Durst ...................................... 426/565 |
| 4,039,693 | 8/1977 | Adams et al. .......................... 426/565 |
| 4,242,367 | 12/1980 | Igoe ....................................... 426/573 |
| 4,308,294 | 12/1981 | Rispoli et al. . |
| 4,312,891 | 1/1982 | Eisfeldt . |
| 4,369,196 | 1/1983 | Sukegawa . |
| 4,370,353 | 1/1983 | Yagi et al. . |
| 4,411,926 | 10/1983 | Trumbetas .............................. 426/570 |
| 4,421,778 | 12/1983 | Kahn et al. ............................. 426/564 |
| 4,434,186 | 2/1984 | Desia et al. . |
| 4,443,486 | 4/1984 | Guiseley . |
| 4,542,035 | 9/1985 | Huang et al. ........................... 426/565 |
| 4,552,773 | 11/1985 | Kahn et al. ............................. 426/564 |
| 4,552,774 | 11/1985 | Gronfor . |
| 4,568,555 | 2/1986 | Spanier . |
| 4,571,338 | 2/1986 | Okonogi et al. ....................... 426/324 |
| 4,609,554 | 9/1986 | Barua et al. . |
| 4,623,552 | 11/1986 | Rapp . |
| 4,650,683 | 3/1987 | Guittard et al. . |
| 4,689,239 | 8/1987 | Rispoli et al. . |
| 4,692,340 | 9/1987 | Grutte et al. . |
| 4,701,329 | 10/1987 | Nelson ................................... 426/580 |
| 4,737,372 | 4/1988 | Bender et al. .......................... 426/5 |
| 4,748,040 | 5/1988 | Kuypers ................................. 426/569 |
| 4,788,075 | 11/1988 | Joseph et al. . |
| 4,810,518 | 3/1989 | Haesman ............................... 426/578 |
| 4,837,035 | 6/1989 | Baker et al. . |
| 4,853,243 | 8/1989 | Kahn et al. ............................. 426/564 |
| 4,855,155 | 8/1989 | Cavallin . |
| 4,869,916 | 9/1989 | Clark et al. . |
| 4,910,035 | 3/1990 | Ellis . |
| 4,931,302 | 6/1990 | Leshik et al. . |
| 4,943,445 | 7/1990 | Norton et al. . |
| 4,956,186 | 9/1990 | Streiff et al. . |
| 4,956,193 | 9/1990 | Cain et al. . |
| 4,988,529 | 1/1991 | Nakaya et al. ......................... 426/569 |
| 5,079,024 | 1/1992 | Crane . |
| 5,112,626 | 5/1992 | Huang et al. ........................... 426/43 |
| 5,175,013 | 12/1992 | Huang et al. ........................... 426/565 |
| 5,202,085 | 4/1993 | Wisler .................................... 426/584 |
| 5,202,145 | 4/1993 | Wisler .................................... 426/569 |
| 5,250,316 | 10/1993 | Harris . |
| 5,252,352 | 10/1993 | Banach et al. . |
| 5,279,844 | 1/1994 | Wesdorp et al. . |
| 5,290,582 | 3/1994 | Dressler ................................. 426/584 |
| 5,304,387 | 4/1994 | Hine . |
| 5,338,560 | 8/1994 | Wesdorp et al. . |
| 5,338,561 | 8/1994 | Campbell et al. . |
| 5,358,728 | 10/1994 | Marten ................................... 426/565 |
| 5,393,549 | 2/1995 | Badertscher et al. . |
| 5,416,077 | 5/1995 | Hwang et al. . |
| 5,456,936 | 10/1995 | Toonen .................................. 426/565 |
| 5,458,904 | 10/1995 | Zolper . |
| 5,538,751 | 7/1996 | Carter et al. . |
| 5,607,716 | 3/1997 | Doherty et al. . |
| 5,730,525 | 3/1998 | Browne .................................. 366/197 |
| 5,766,665 | 6/1998 | Miller .................................... 426/565 |
| 5,853,785 | 12/1998 | Nayyar .................................. 426/565 |

OTHER PUBLICATIONS

Fennema 1996 Food Chemistry 3rd Edition Marcel Dekker Inc New York pp. 211–213.

Glickman 1982 Food Hydorcolloids vol. 1 CRC Press Inc Boca Raton Florida pp. 65, 67–70, 143, 30, 37.

Thomas 1985 Ice Cream Stabilizer Food Engineering 57(5) 69, 72.

*Primary Examiner*—Carolyn Paden
*Attorney, Agent, or Firm*—Fitzpatrick, Cella, Harper & Scinto

[57] ABSTRACT

This invention relates to low fat, shelf-stable, ready-to-drink milk shake beverages having the mouth feel of high fat milk shake beverages. A unique combination of three carrageenans along with the other claimed ingredients give these low fat milk shake beverages the desired mouth feel of high fat milk shake beverages. In particular, the invention relates to low (about 1.1 percent or less) fat, shelf-stable (for at least about six months of non-refrigerated storage), ready-to-drink milk shake beverages comprising water, a dairy ingredient comprising cream and non-fat milk solids, a sodium or potassium orthophosphate buffering agent, a combination of three carrageenans comprising at least one kappa carrageenan having strong casein reactivity, at least one kappa carrageenan having weak casein reactivity, and at least one lambda carrageenan, a fat mimetic modified food starch, a nutritive sweetener, and an alkaline agent selected from the group consisting of an alkaline orthophosphate, sodium or potassium hydroxide and sodium or potassium carbonate.

8 Claims, No Drawings

LOW FAT, SHELF-STABLE, READY-TO-DRINK MILK SHAKE BEVERAGES HAVING THE MOUTH FEEL OF HIGH FAT MILK SHAKE BEVERAGES

FIELD OF THE INVENTION

The present invention relates to low fat, shelf-stable, ready-to-drink milk shake beverages having the mouth feel of high fat milk shake beverages.

In particular, the present invention relates to low (about 1.1 percent or less) fat, shelf-stable (for about one year of non-refrigerated storage, ready-to-drink milk shake beverages. A unique combination of three carrageenans give these low fat milk shake beverages the desired mouth feel of high fat milk shake beverages.

More particularly, the present invention relates to low fat, shelf-stable, ready-to-drink milk shake beverages comprising water, a dairy ingredient comprising cream and non-fat milk solids, a sodium or potassium orthophosphate buffering agent, a combination of three carrageenans comprising at least one kappa carrageenan having strong casein reactivity, at least one kappa carrageenan having weak casein reactivity, and at least one lambda carrageenan to increase viscosity, a fat mimetic modified food starch for mouthfeel, a nutritive sweetener, and an alkaline agent selected from the group consisting of an alkaline orthophosphate, sodium or potassium hydroxide and potassium or sodium carbonate.

BACKGROUND OF THE INVENTION

All currently marketed low fat, shelf-stable milk shake beverages lack the rich, creamy mouth feel of milk shake beverages having high fat contents.

A recently-filed patent application, U.S. patent application Ser. No. 08/834,549 entitled "Process For Making Milk Shake Beverage Compositions Having Improved Consistency, Flavor and Physical Stability" filed on Apr. 4, 1997, discloses processes for making milk shake beverage compositions having improved consistency, flavor and physical stability. These particular processes eliminate or modify the step of pasteurization in order to limit the swelling of starch granules and thereby avoid the detrimental effects that the shearing forces of homogenization have on swollen starch granules. However, changing unit operation processing conditions, such as reversing the sequence of pasteurization and homogenization, involves a redesign of the process scheme, which is both time consuming and costly.

In contrast to the process changes required in the above-mentioned patent application, the present invention involves the use of a unique combination of three carrageenans, which in combination with the other claimed ingredients, are more resistant to the shear forces of homogenization, thereby providing a low fat milk shake beverage having the mouth feel of high fat milk shake beverages, in addition to having physical stability.

None of the prior art references, for example, U.S. Pat. Nos. 3,962,482; 4,650,683 and 5,458,904, discloses a low fat, shelf-stable, ready-to-drink milk shake beverage having the mouth feel of high fat milk shake beverages. Moreover, none of the prior art references discloses low fat milk shake beverages containing the presently-claimed unique combination of three carrageenans—a kappa carrageenan having strong casein reactivity, a kappa carrageenan having weak casein reactivity and a lambda carrageenan to regulate viscosity.

The present inventors have discovered that the combination of these three carrageenans is required in order to achieve the desired creamy consistency of a high fat milk shake beverage and to maintain physical stability. Most other carrageenans, either alone or in blends, will actually further destabilize this type of milk shake beverage system when it submitted to retort heating. The unique combination of carrageenans of the present invention, on the other hand, stabilizes the beverage from cream separation, phase separation, syneresis and protein coagulation, and also contributes to the rich creamy mouth feel and body of the low fat milk shake beverage of the present invention.

It is very difficult to make a retorted dairy product that is physically stable. With a milk shake beverage like the present invention, a formulator has to be concerned about three major categories of physical stability—(1) the elimination of the fat cream layer at the surface, (2) the avoidance of a clear whey layer at the top, and (3) the avoidance of severe mottling probably due to insoluble whey protein complexes. These factors tend to work against each other. Thus, a stabilizer system which eliminates the cream layer will usually concurrently cause insoluble whey protein complexes and a clear whey separation. These are signs of what is called overstabilization. Therefore, in formulating the presently claimed beverages, one has to be concerned about under and over stabilizing one aspect or another of the dairy beverage system.

The present inventors were also faced with a critical fourth issue—the consumer has to enjoy drinking the concoction. Most stabilizers not effective in this type of system because they are not effective in dairy systems or in neutral systems or under high heat. While carrageenans are the one type of hydrocolloid that can be effective in this system, most individual carrageenan types or blends will actually destabilize the system further. In addition, individual carrageenans or blends are ineffective in providing the desired mouth feel because they either do not provide sufficient mouth feel and body or they make the system gummy or have too much mouth coating. However, by using the unique three carrageenan combination of the present invention, all these problems are simultaneously solved. There is no cream layer or clear whey separation, nor is there a problem with protein separation. Also, the product has a most pleasant texture and mouth feel. It is believed that the desired mouth feel is derived from the combination of the three carrageenans, the fat mimetic modified food starch and the dairy ingredient.

Because the beverages of the present invention are low in fat (containing about 1.1 percent or less by weight of fat based on the total weight of the beverage), they have the advantages associated with reduced fat intake that many health conscious individuals are seeking, but none of the disadvantages, such as lack of mouth feel, that are associated with beverages having low fat contents.

Another advantage of the present invention is that the claimed milk shake beverages are shelf-stable, and have non-refrigerated storage stabilities of about one year. That is, there is no appreciable deterioration in quality for at least about twelve months.

Another advantage of the present invention is that the beverages are ready-to-drink, which means that they can be consumed directly from the container without any further preparation normally associated with powders and concentrates which must be reconstituted, or with freshly prepared products which must be made from scratch.

These and additional objects and advantages of the present invention are shown from the descriptions below.

SUMMARY OF THE INVENTION

This invention relates to a low fat, shelf-stable, ready-to-drink milk shake beverage comprising about 75 to 90 percent by weight of water, a dairy ingredient comprising cream and non-fat milk solids in sufficient concentration such that the beverage has a non-fat milk solids content of about 4 to about 8 percent by weight, a sodium or potassium orthophosphate in sufficient concentration such that the beverage has a pH of about 6.5 to about 7.0, a unique combination of three carrageenans comprising about 30 to about 150 ppm (parts per million) by weight of at least one kappa carrageenan having strong casein reactivity, about 100 to about 250 ppm by weight of at least one kappa carrageenan having weak casein reactivity and about 50 to about 250 ppm by weight of at least one lambda carrageenan, about 2 to 4 percent by weight of a fat mimetic modified food starch, about 5 to about 10 percent by weight of a nutritive sweetener, and about 0.01 to about 0.15 percent by weight of an alkaline agent selected from the group consisting of an alkaline orthophosphate, sodium or potassium hydroxide and sodium or potassium carbonate. The low fat milk shake beverages of the present invention comprise about 1.1 percent or less by weight of fat, based on the total weight of the beverage.

Unless otherwise specifically indicated, all percentages are weight percents based upon the total weight of the beverage.

In preferred embodiments of the above-described milk shake beverages, the dairy ingredient of the present invention comprises cream and non-fat dry milk. The sodium orthophosphate comprises disodium phosphate. The potassium orthophosphate comprises dipotassium phosphate. The nutritive sweetener comprises sucrose.

Producing a stable, high quality, low fat milk shake beverage having the desired mouth feel, which is able to withstand retort processing followed by storage at room temperature for about one year, was a very difficult task. This invention demonstrates the success of this task by disclosing low fat, shelf-stable, ready-to-drink milk shake beverages having high acceptability.

DETAILED DESCRIPTION OF THE INVENTION

The Water Ingredient

Water can be used as a separate ingredient or supplied from the dairy ingredient. When used separately, it is preferable to use treated water, such as from reverse osmosis.

The concentration of water that may be used in the beverage formulations of the present invention ranges from about 75 to about 90 percent by weight, based on the total weight of the beverage.

The Dairy Ingredient Comprising Cream

A dairy ingredient comprising cream and non-fat milk solids in sufficient concentration such that the beverage will have a non-fat milk solids content of about 4 to about 8 percent by weight is required in the milk shake beverages of the present invention. In a more preferred embodiment, the non-fat milk solids content ranges from about 5 to about 7 percent by weight. At a non-fat milk solids content less than about 4 percent by weight, the milk shake beverages are likely to be thin and lack the consistency of milk shakes, whereas such compositions are likely to be unstable at a non-fat milk solids content greater than about 8 percent.

As used herein, the term "non-fat milk solids" refers to the total amount of milk solids (on a dry basis exclusive of milk fat) that are present in the milk shake beverages of the present invention. Non-fat milk solids include milk protein (e.g., casein and whey protein), milk sugars (e.g., lactose), minerals and vitamins. The fat and non-fat milk solids content should be determined at the time of preparing the initial batch mixture.

Any dairy ingredient or combination of dairy ingredients comprising creams can be used. These dairy ingredients in addition to creams include, but are not limited to, fluid milks (whole, reduced or low fat and skim), condensed milks (whole, reduced or low fat and skim) and dry powdered milks (whole, reduced or low fat and non-fat). The dairy ingredients also include caseins, caseinate salts, whey proteins, whey retentates and whey permeates. These dairy ingredients can be used alone or in combination so long as the fat content of the beverage is about 1.1 percent or less by weight, and the non-fat milk solids content of the beverage is about 4 to about 8 percent by weight, based on the total weight of the beverage. As a general rule, the concentration of dairy ingredient(s) that may be used in the milk shake beverages of the present invention is dependent upon the desired fat and the non-fat milk solids contents.

The cream ingredient can be obtained from regular cream, heavy cream and dry cream and mixtures thereof. Liquid cream with fat contents ranging from approximately 15–45% or dry cream with fat contents of approximately 20–50% can be used.

A particularly preferred of dairy ingredient comprising cream as shown in the examples below is a combination of heavy cream and non-fat dry milk.

Powdered milk or non-fat dry milk solids can be used either by mixing them with water or by adding them directly to the other ingredients without first mixing them with water.

The milk solids can be selected from milk sources which have received minimum heat treatment in order to yield a clean taste, optimum stability and color in the final product. A typical source of milk solids, in addition to cream, can be low heat non-fat dry milk or low fat 1% liquid milk. The butter fat can come from pasteurized heavy cream or from low fat 1% liquid milk. While the concentration of milk solids can vary within the claimed ranges depending on the nutritional value sought, it should be realized that varying the levels of milk solids may require adjustment of the concentration levels of the other ingredients in order to maintain equivalent stability and body characteristics.

The preferred dairy-based sources of non-fat milk solids for this invention are cream and any one or more of condensed skim milk, fluid whole milk, low fat 1% milk, skim milk and non-fat dry milk. As previously mentioned, the preferred non-fat dry milk is the low heat type.

The milk shake beverages of the present invention may contain heavy cream derived from milk. The heavy cream can be either UHT (ultra high temperature) processed or pasteurized. The heavy cream is preferably present in an amount of from about 1.5% to about 3.0% by weight, with from about 2.0% to about 2.5% by weight being even more preferred, based on the total weight of the milk shake beverage. The heavy cream provides the final beverage composition with proper stability and mouth feel. If less than 1.5% by weight heavy cream is employed, the final composition is likely to lack proper mouth feel, whereas amounts of heavy cream in excess of 3.0% by weight is likely to jeopardize the low fat claim.

The pH Buffering Ingredient

In accordance with the teachings of this invention, the pH buffering ingredients of the claimed milk shake beverages can be sodium or potassium orthophosphates. The preferred orthophosphate pH buffering ingredients are disodium phosphate and dipotassium phosphate.

These orthophosphates must be present in sufficient concentration such that the milk shake beverages have a pH of about 6.5 to about 7.0, more preferably a pH from about 6.6 to about 6.9, and even more preferably a pH of 6.7. At a pH lower than about 6.5, the milk shake beverages will be unstable. On the other hand, the beverages are likely to become discolored at pH's greater than about 7.0. A pH that will prevent precipitation of milk proteins or curdling of the dairy ingredient during the heating process is necessary. Sufficient quantities of this pH buffering ingredient is therefore required to obtain the desired pH.

It should be noted that the pH of the milk shake beverage of the present invention is likely to go down by approximately 0.3 pH units during the retorting treatment. Therefore, it is often beneficial to adjust the pH of the milk shake mixture up to 7.0 prior to the retort or UHT (ultra high treatment) operation.

As one example, a milk shake beverage of the present invention may contain disodium phosphate in an amount of from about 0.010 to about 0.03% by weight, and more preferred from about 0.015 to about 0.025% by weight, based on the total weight of the beverage. Disodium phosphate improves the heat stability of the milk shake beverage.

The Combination of Three Carrageenans

The milk shake beverages of the present invention require a combination of three carrageenans comprising about 30 to about 150 ppm by weight of at least one kappa carrageenan having strong casein reactivity, about 100 to about 250 ppm by weight of at least one kappa carrageenan having weak casein reactivity, and about 50 to about 250 ppm by weight of at least one lambda carrageenan, all weights based on the total weight of the beverage.

The first kappa carrageenan of the present invention has strong casein reactivity. This first kappa carrageenan has a molecular weight of only about 100,000 to about 300,000 daltons. This allows the carrageenan to form extra tight ionic bonds with the casein, and hence a very strong three dimensional network. This carrageenan is relatively lower in molecular weight compared to the second kappa carrageenan. A commercial example of this first kappa carrageenan having strong casein reactivity is FMC's Seakem CM 611 product.

The kappa carrageenan having strong casein reactivity works very well to completely eliminate the cream layer. Its mechanism of action is the inhibition of fat coalescence. After homogenization, the fat globules are small and the dairy protein helps to keep the fat emulsified. The kappa carrageenan having strong casein reactivity and the casein meanwhile form a strongly bridged network with each other. Because the fat globules are entrapped in this network, they cannot coalesce. If too much of this first kappa carrageenan, which forms a tight network, is present, it would result in whey separation because water with dissolved whey proteins would be squeezed out due the tighter carrageenan-casein complex. Whey proteins, like the fat globules mentioned above, can be entrapped in the carrageenan-casein complex, but eventually they can be squeezed out into a clear whey layer if the carrageenan-casein network becomes too powerful due to strengthened carrageenan-casein bonds. Therefore, the first kappa carrageenan having strong casein reactivity is used at a level of about 30 to about 150 ppm by weight, preferably about 40 to about 100 ppm by weight, and most preferably about 50 to about 80 ppm by weight, based on the total weight of the beverage.

In addition to the first kappa carrageenan having strong casein reactivity, the present inventors discovered the need for other carrageenan-casein complexes of a weaker nature to provide additional suspension and viscosity. This was accomplished by the use of a second kappa carrageenan having weak casein reactivity. This second kappa carrageenan has a molecular weight in the range of about 400,000 to about 600,000 daltons, which does not allow it to link as closely with the casein, due to the steric hindrance of this large carrageenan molecule. A commercial example of this second kappa carrageenan having weak casein reactivity is FMC's Seakem PS 310 product.

This second kappa carrageenan having weak casein reactivity has a higher molecular weight compared to the first kappa carrageenan and forms looser bonds with the casein proteins. By itself, this second kappa carrageenan would not be strong enough to fully inhibit cream separation at the top of the bottle, but if all the suspending requirements were left to the first kappa carrageenan having strong casein reactivity, whey separation would occur. Thus, a balance of the two kappa carrageenans is essential. The second kappa carrageenan having weak casein reactivity is used at a level of about 100 to about 250 ppm by weight, preferably at a level of about 130 to about 220 ppm by weight, and most preferably at a level of about 150 to about 200 ppm by weight.

The third and final carrageenan used in the milk shake beverages of the present invention is a lambda carrageenan. Commercial examples of this lambda carrageenan include GP 209 and GP 109 from FMC. This third lambda carrageenan provides a pleasant full and rich mouth feel to the low fat milk shake beverage, along with viscosity. Because the lambda carrageenan does not have a tight helical structure, it is more randomly distributed in water, and therefore provides viscosity and body, but not a suspension creating structure for holding fat globules or whey proteins. The concentration of the lambda carrageenan must also be controlled because at higher levels it can cause destabilization due to its protein reactivity. Therefore, the lambda carrageenan is used at levels of about 50 ppm to about 250 ppm by weight, preferably about 100 to about 200 ppm by weight, and most preferably about 120 to about 180 ppm by weight, based on the total weight of the beverage.

The Fat Mimetic Modified Food Starch

Another ingredient which the low fat milk shake beverages of the present invention require is a fat mimetic modified food starch, for example, N-Lite-L from National Starch. About 2 to 4 percent by weight of this fat mimetic modified food starch is required, with from about 2.5 to about 3 percent by weight being preferred. If less than about 2 percent by weight of this starch is employed, the resulting milk shake beverage is likely to be thin in consistency, whereas the use of more than about 4 percent by weight of this starch is likely to provide a final composition possessing thick consistency, but with an unpalatable starchy taste.

This starch ingredient supplements the mouth feel of the carrageenan combination and provides additional fat mimetic properties desired for the rich creamy mouth feel of the low fat milk shake beverages of the present invention.

In addition, the fat mimetic modified food starch suitable for use in the present invention preferably possesses a range in diameter of from about 5 to about 30 microns, with the average diameter preferably being from about 10 to about 20 microns, and more preferably about 15 microns. National Starch's N-Lite L is an example of a commercially available fat mimetic modified food starch.

The Alkaline Agent

Another ingredient required in the milk shake beverages of the present invention is an alkaline agent, which is used to adjust pH. This alkaline agent is selected from the group consisting of an alkaline orthophosphate, potassium hydroxide and potassium carbonate. About 0.01 to about 0.15 percent by weight of an alkaline agent selected from the group consisting of an alkaline orthophosphate, sodium or potassium hydroxide and sodium or potassium carbonate is required, based on the total weight of the beverage. The amount will depend, of course, on the type of alkaline agent used and on the degree to which the pH must be adjusted.

The Nutritive Sweetener

The milk shake beverages of the present invention also require the use of a nutritive sweetener. Preferably, the sugar is present in an amount of from about 5% to about 10% by weight, with an amount of from about 6% to about 8% by weight being even more preferred, depending on flavor type (e.g., higher for chocolate). Use of sugar in an amount of less than about 5% by weight may provide a final beverage composition lacking sweetness, whereas using sugar in amounts exceeding about 10% by weight risks high calorie content. The preferred sugar component for use in the present invention is sucrose, both in the liquid and the granular forms. Other types of sugars or mono or disaccharides with reducing properties may cause discoloration of the milk shake beverages during retorting.

Other Ingredients

The milk shake beverages of the present invention also may contain one or more natural and/or artificial retortable flavorants. Suitable natural flavorings include: citrus and non-citrus fruit flavors (e.g., whole or comminuted fresh fruit, fruit purees, fruit concentrates, extracts or essences, candied or glazed fruits, and dried fruits), and sugar-free versions of such fruit flavorings; flavors derived from botanicals; spices; chocolate, cocoa or chocolate liquor; coffee; flavorings obtained from vanilla beans; nuts, including nut meats and nut extracts from pecans, walnuts, almonds, pistachios, filberts and peanuts; liqueur flavorants such as alcohol, whiskey and other distilled beverages, fruit brandy distillate and brandy flavor essence, and fruit liqueurs. Suitable artificial flavorants include aromatic chemicals and imitation flavors.

The flavorant can be in an amount of from about 0.1% to about 1.0% by weight, depending on the type of flavorant (e.g., natural, artificial or blend). In one embodiment, the flavorant is cocoa, and it is present in an amount of from about 0.5% to about 1.0% by weight.

One or more natural and/or artificial colorants also may be added to the compositions of the present invention to obtain desired aesthetic effects. These colorants may be selected from any of the colorants conventional in the art such as caramel color, red #3 and yellow #5. The preferred colorant for a milk shake beverage is product dependent. The amount of colorant employed will depend on desired end-product characteristics, but will typically be on the order of from about 0.0005% to about 0.0035% by weight.

Process of Making the Milk Shake Beverages

EXAMPLE 1

A typical process for producing the low fat, shelf-stable, ready-to-drink milk shake beverages of the present invention is as follows:

A 500 pound batch of a milk shake beverage according to the present invention, having improved stability, was produced by following the processing conditions (batching, high temperature short time pasteurization, homogenization and retorting) as outlined in Table 1 and discussed below.

TABLE 1

Formula for 500 lbs. Milk Shake Base

| Ingredients | Percent By Weight | Quantity (in pounds) |
| --- | --- | --- |
| Water for mixing | 79.6110 | 398.06 |
| Non-fat Dry Milk - low heat | 6.446 | 32.23 |
| Sugar (Granular) | 8.000 | 40.00 |
| Heavy Cream | 2.638 | 13.19 |
| Modified Food Starch (Fat Mimetic Type) | 3.250 | 16.25 |
| Disodium Phosphate | 0.019 | 0.10 |
| Carrageenan (kappa having weak casein reactivity) | 0.018 | 0.090 |
| Carrageenan (Lambda) | 0.013 | 0.065 |
| Carrageenan (kappa having strong casein reactivity) | 0.005 | 0.025 |
| TOTAL | 100.00 | 500.00 |

A. Batching

Transfer the required amount of water previously treated by reverse osmosis, at 120° F. into a liquefier. Add non-fat dry milk to the water and mix for 3 minutes, followed by starch and sugar and mix for 3 minutes after each step of addition of ingredients. Transfer the mixture from the liquefier to a holding tank. Add the heavy cream to the holding tank with slow agitation, followed by a predissolved combination of the three carrageenans with sugar at a ratio of 3 parts sugar to 1 part carrageenan, 120° F. water (2.5% by weight carrageenan based on the weight of the water), and predissolved disodium phosphate in 120° F. water (10% solution). Mix this combination for an additional 15 minutes at medium speed prior to the high temperature short time (HTST) pasteurization step.

B. HTST and Homogenization

Heat treat the blended batch through a heat exchanger at 170° F. and hold for 4 minutes and then homogenize at a pressure of 4500 psi (4000 psi in the first stage and 500 psi in the second stage). Immediately cool down the product to 45° F. through the heat exchanger.

C. Standardization for pH and Solids

Adjust the pH of the mixture with a 10% solution of potassium hydroxide to 7.0. Adjust the solids content of the mixture with water to a target solids content of 18.22%.

D. Flavoring/Coloring

Weigh the base into three different portions and add different flavors and colors as shown in Table 2.

E. Fill

Fill the product into glass bottles and retort in a commercial stock agitating retort to achieve commercial sterility.

TABLE 2

Formulas For Milk Shake with Different Flavors

|  | Vanilla | Strawberry | Banana |
| --- | --- | --- | --- |
| A. Composition | | | |
| Quantity of Base From Table 1 | 70 lbs. | 20 lbs. | 20 lbs. |
| Vanilla Extract | 15.88 gms. | | |

TABLE 2-continued

Formulas For Milk Shake with Different Flavors

|  | Vanilla | Strawberry | Banana |
|---|---|---|---|
| Imitation Vanilla Flavor | 63.50 gms. | | |
| Strawberry Flavor (Natural/Artificial) | | 22.68 gms. | |
| Banana Flavor (Natural) | | | 81.65 gms. |
| Red #3 | | 0.045 gms. | |
| Yellow #5 | | | 0.299 gms. |
| B. Product Specifications | | | |
| Viscosity (4° C.) Brookfield Digital (Model LVTDVII) Spindle #34 | 90 CPS (Centipose) | 93 CPS | 84 CPS |
| Total Solids | 18.7 | 18.7 | 18.7 |
| pH | 6.7 | 6.7 | 6.7 |
| C. Product Stability | | | |
| Stress Test | >10 Cycles | >10 Cycles | >10 Cycles |

Stored at oscillating temperatures (40° F. for 8 hours and 110° F. for 16 hours). Ten cycles = 5 days.

As shown in Table 2, beverages made by this invention exhibited a consistency of milk shake as shown by the viscosity measurement. However viscosity measurements alone do not adequately characterize the body/mouth feel of the beverage. From sensory evaluations, the creamy mouth feel becomes apparent. The creamy mouth feel is contributed by the unique stabilizer, thickener, and milk protein combination which constituted the base for this invention. The milk shake beverages are physically stable as shown by the stress test results. Products were also stable when stored at various temperatures (40°, 70°, and 90° F.). for at least six months or longer.

EXAMPLE 2

Based on the findings of Example 1, the beverage containing the combination of three carrageenans was also applied to the chocolate milk shake beverage shown in Table 3. 300 grams of natural cocoa powder was used in each of the examples in Table 3. In addition, 0.025% of buffering agent, disodium phosphate, was used in each of those examples, as well as an alkaline agent, potassium hydroxide, at 0.01 to 0.05%. This beverage was then compared with a similar milk shake beverage containing only one kappa carrageenan. The processing conditions are similar as shown in Example 1.

TABLE 3

Formulas For Chocolate Milk Shake Beverage With Different Types Of Carrageenans

|  | One Carrageenan | Three Carrageenan Combination |
|---|---|---|
| Non-Fat Dry Milk | 2593.533 gms. | 2593.553 gms. |
| Cocoa Powder | 300.0 gms. (in 2700 gms water) | 300.0 gms. (in 2700 gms water) |
| Heavy Cream | 689.6 gms. | 689.6 gms. |

TABLE 3-continued

Formulas For Chocolate Milk Shake Beverage With Different Types Of Carrageenans

|  | One Carrageenan | Three Carrageenan Combination |
|---|---|---|
| Sugar (Granular) | 3800.00 gms. | 3800.00 gms. |
| Fat Mimetic modified food starch | 800.00 gms. | 800.00 gms. |
| Carrageenan (kappa having strong casein reactivity) | 8.00 gms. | — |
| Carrageenan (kappa having weak casein reactivity) | — | 7.2 gms. |
| Carrageenan (Lambda) | — | 5.2 gms. |
| Carrageenan (kappa having strong casein reactivity) | — | 2.0 gms. |
| Disodium phosphate | 7.6 gms | 7.6 gms |
| Water | 64.0 lbs. | 64.0 lbs. |
| TOTAL | ~40,000 gms. | ~40,000 gms. |
| Viscosity | 38 CPS | 46 CPS |

Even though there is only a slight increase in viscosity, the milk shake containing the combination of three carrageenans of the present invention provided a fuller, creamier mouth feel as judged by six experts. Also, the stability of this milk shake beverage containing the three carrageenans was greatly improved and the rate of cocoa settling had been decreased significantly as judged on the products stored at three different temperatures (40°, 70° and 90° F.) for two weeks.

What is claimed is:

1. A low fat, shelf-stable, ready-to-drink milk shake beverage comprising:

(i) about 75 to 90 percent by weight of water, (ii) a dairy ingredient comprising cream and non-fat milk solids in sufficient concentration such that the beverage has a non-fat milk solids content of about 4 to about 8 percent by weight, (iii) a sodium or potassium orthophosphate in sufficient concentration such that the beverage has a pH of about 6.5 to about 7.0, (iv) a combination of three carrageenans comprising
  (a) about 30 to about 150 ppm by weight of at least one kappa carrageenan having strong casein reactivity,
  (b) about 100 to about 250 ppm by weight of at least one kappa carrageenan having weak casein reactivity, and
  (c) about 50 to about 250 ppm by weight of at least one lambda carrageenan, (v) about 2 to 4 percent by weight of a fat mimetic modified food starch, (vi) about 5 to about 10 percent by weight of a nutritive sweetener, and (vii) about 0.01 to about 0.15 percent by weight of an alkaline agent selected from the group consisting of an alkaline orthophosphate, sodium hydroxide, potassium hydroxide, sodium carbonate and potassium carbonate, wherein said beverage comprises about 1.1 percent or less by weight of fat, based on the total weight of the beverage.

2. The beverage according to claim 1 wherein said dairy ingredient comprises cream and non-fat dry milk.

3. The beverage according to claim 1 wherein said sodium orthophosphate comprises disodium phosphate.

4. The beverage according to claim 1 wherein said potassium orthophosphate comprises dipotassium phosphate.

5. The beverage according to claim 1 wherein said alkaline agent is an alkaline orthophosphate.

6. The beverage according to claim 1 wherein said alkaline agent is potassium hydroxide.

7. The beverage according to claim 1 wherein said alkaline agent is potassium carbonate.

8. The beverage according to claim 1 wherein said nutritive sweetener comprises sucrose.

\* \* \* \* \*